(No Model.)

Z. C. SMITH.
WASHING MACHINE.

No. 268,954. Patented Dec. 12, 1882.

Witnesses.
Inventor.

UNITED STATES PATENT OFFICE.

ZEPHANIAH C. SMITH, OF BROOKLYN, NEW YORK.

WASHING-MACHINE.

SPECIFICATION forming part of Letters Patent No. 268,954, dated December 12, 1882.

Application filed July 19, 1882. (No model.)

*To all whom it may concern:*

Be it known that I, Z. C. SMITH, of Brooklyn, in the county of Kings and State of New York, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in washing-machines; and it consists in a revolving cage, in which the clothes are placed to be washed, and which has a series of openings extending from the center toward the edge, in combination with inclines which fill all the spaces between the openings.

It still further consists in the combination of a revolving cage having openings through its bottom, with the inclines which fill the spaces between the openings, and stops which are secured to the bottom of the cage at the lower front edges of the inclines, all of which will be more fully described hereinafter.

The object of my invention is to produce a machine which will thoroughly cleanse soiled clothing by simply forcing water through and over them without exerting any rubbing movement upon them.

Figure 1:
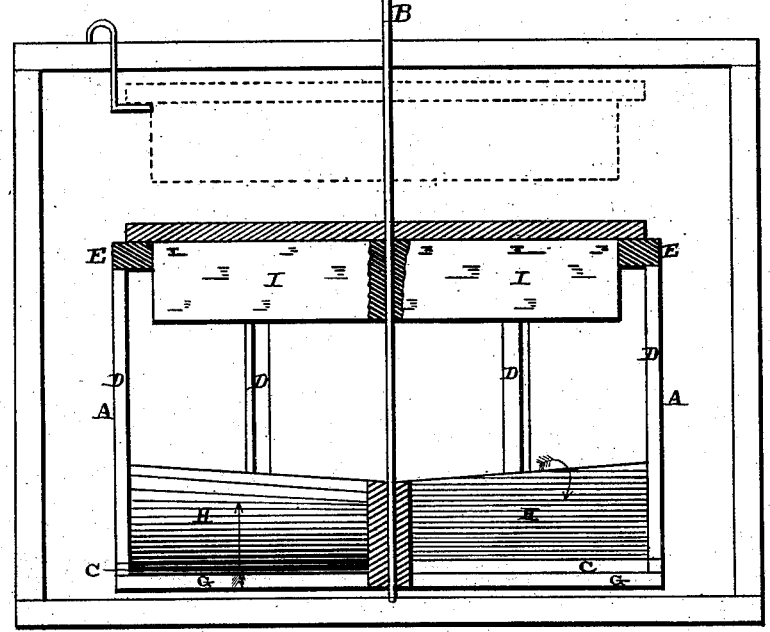
Figure 3:
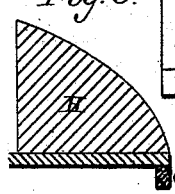
Figure 2:
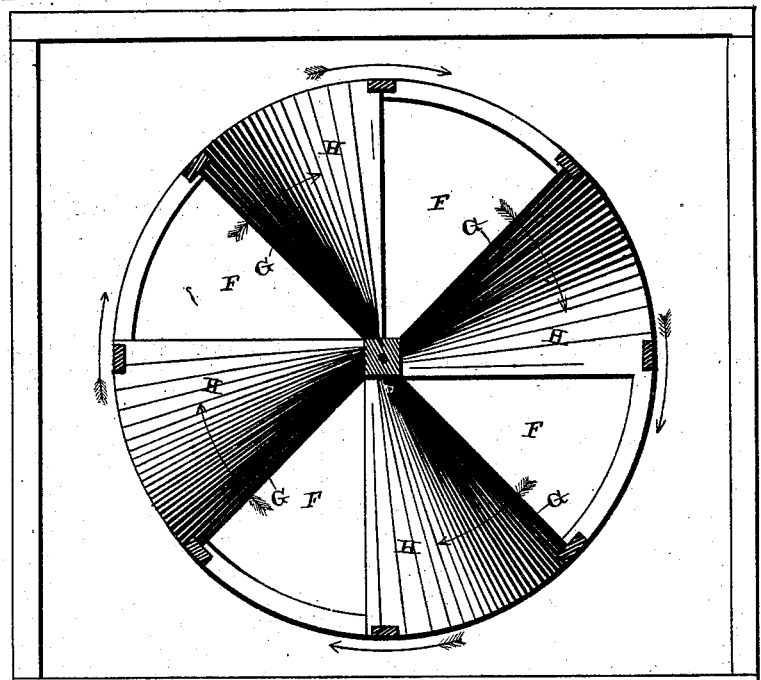

Figure 1 is vertical section of my invention. Fig. 2 is a plan view of the cage with the cover removed. Fig. 3 is a detail view.

The revolving cage A, in which the clothes are placed to be washed, is secured to the cranked shaft B, so as to revolve with the shaft. This cage consists of the perforated bottom C, a number of vertical connecting-pieces, D, and a ring or band, E, at the top. Through the bottom of the cage are made a number of triangular openings, F, through which the water is to be forced by the bars or pieces G, which are secured to the under side of the bottom at the edges of the openings. These pieces form stops to catch against the water as the cage is made to revolve, and thus compel the water to rise upward over the inclines. Were it not for these stops, when the water was low in the tub, the movement of the cage would have but little effect upon the water; but these stops extending down almost in contact with the bottom of the tub catch the water and raise it upward, so that the forward movement of the cage compels the water to pass back up over the inclines. Upon the top of the bottom are secured the inclined planes H, which may be either hollow or solid, and up which the water is forced as the cage is made to revolve by the operator. As the cage revolves through the water, which should rise up a suitable distance above the bottom of the cage, the pieces secured to the bottom catch the water, and thus start it up the inclined surfaces. The water flows up over the top of each one of these inclined surfaces and then drops down over its rear vertical edge. The clothes being placed in the cage are prevented from escaping by means of the vertical side pieces, and as the cage is made to revolve the water is forced up through and over them for the purpose of cleaning them. The cover of this cage is made to slide vertically upon the crank-rod, so that it can be raised upward to allow the clothes to be inserted and then dropped downward upon the top of the cage when the cage is to be set in motion. Secured to the under side of the cover are a number of cross-pieces, I, which project down a suitable distance into the cage, and which serve the double purpose of bracing the cover and at the same time serving as stops to prevent the clothes from being carried around and around in the cage in such a manner that the water will have but little effect upon them. This cage is to be placed in either a suitable frame, which is to be placed inside of a box or tub, or can be journaled directly in the box itself without the help of a frame.

Having thus described my invention, I claim—

1. In a washing-machine, a revolving cage having triangular openings through its bottom extending from near the center outward and having the inclines H formed upon the bottom between the openings, the inclines having their slope all one way and being made to fill the entire space between the openings, substantially as shown.

2. In a washing-machine, the combination of a revolving cage having openings through its bottom with the inclines H and the stops G on their lower front edges, substantially as set forth.

In testimony whereof I affix my signature in presence of two witnesses.

ZEPHANIAH C. SMITH.

Witnesses:
  CHARLES BALL,
  JAMES H. BIRD.